C. R. FORSTER.
LIGHT PROJECTING DEVICE.
APPLICATION FILED MAR. 25, 1904.

961,114.

Patented June 14, 1910.
3 SHEETS—SHEET 1.

Witnesses

Inventor

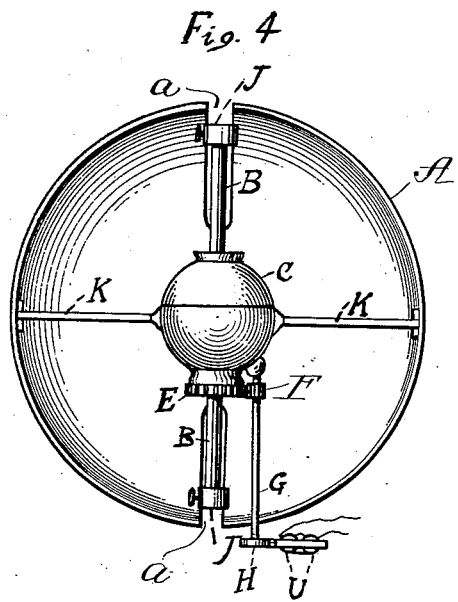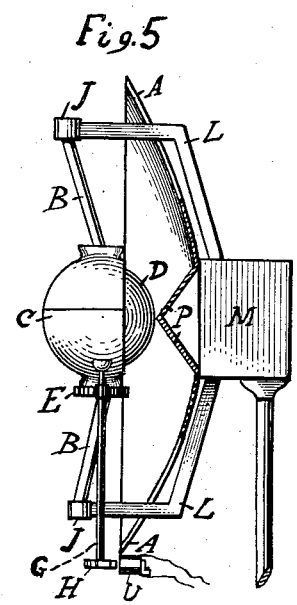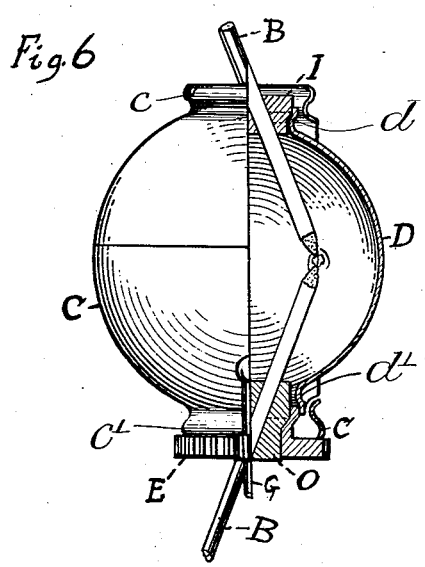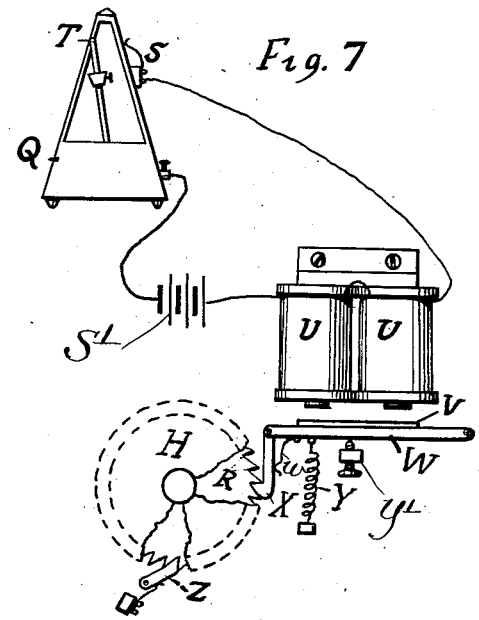

C. R. FORSTER.
LIGHT PROJECTING DEVICE.
APPLICATION FILED MAR. 25, 1904.
961,114.
Patented June 14, 1910.
3 SHEETS—SHEET 3.
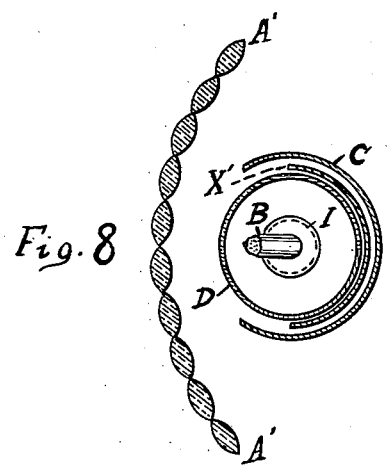
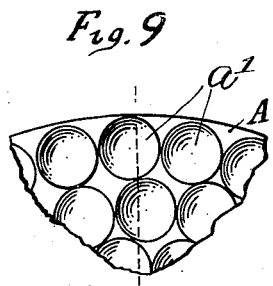
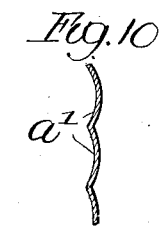
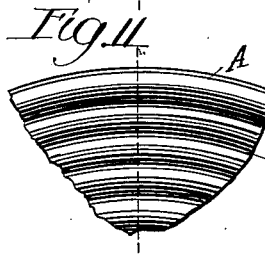
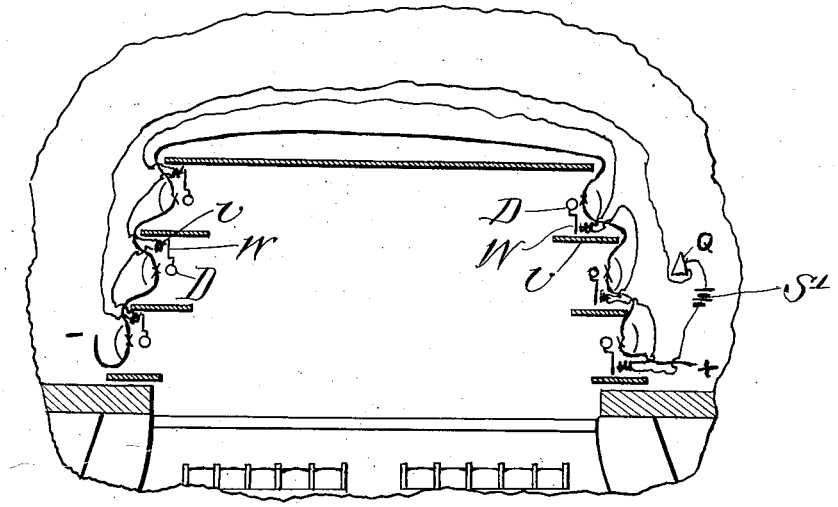
Witnesses
Inventor.
Carl R. Forster
by Elliott & Hopkins
Attorneys

UNITED STATES PATENT OFFICE.

CARL R. FORSTER, OF EVANSTON, ILLINOIS.

LIGHT-PROJECTING DEVICE.

961,114. Specification of Letters Patent. Patented June 14, 1910.

Application filed March 25, 1904. Serial No. 200,027.

*To all whom it may concern:*

Be it known that I, CARL R. FORSTER, a citizen of the United States, residing at Evanston, county of Cook, and State of Illinois, have invented certain new and useful Improvements in Light-Projecting Devices, of which the following is a full, clear, and exact specification.

This invention relates to light projecting devices for use in connection with electric lights or other sources of illumination generally, but it has been designed especially with a view to meeting the particular requirements of theater or stage use where it is desirable to produce color effects and "dimming" or changes from light to darkness.

One of the objects of the invention is to provide a device of this character whereby easy and gradual changes may be made in the color of a light projected from a light or lamp similar to the effect which has heretofore been produced by the use of multicolor incandescent lamps used in connection with rheostats or dimmers.

A further object of the invention is to produce a gradual dimming or lessening of the intensity of the light projected in the manner as herein set forth.

A still further object of the invention is to produce the gradual color change and dimming effect of a plurality of lamps synchronously and simultaneously, yet a further object of the invention is to provide a device of this character which shall be entirely fireproof, and which will not ignite surrounding objects.

With these ends in view my invention consists in certain features of novelty in the construction, combination and arrangement of parts by which the said objects and certain other objects hereinafter appearing are attained, all as fully described with reference to the accompanying drawings and more particularly pointed out in the claims.

Figure 1:
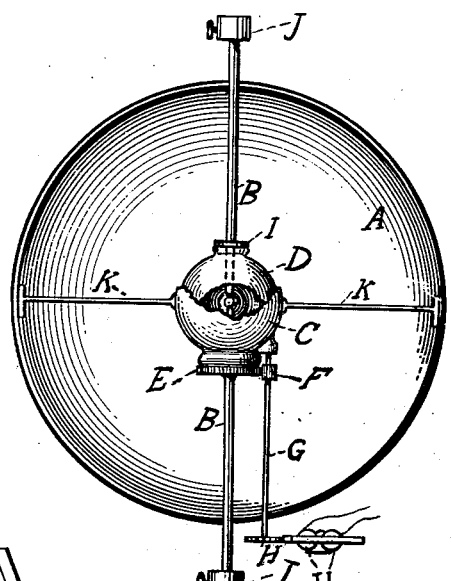
Figure 2:
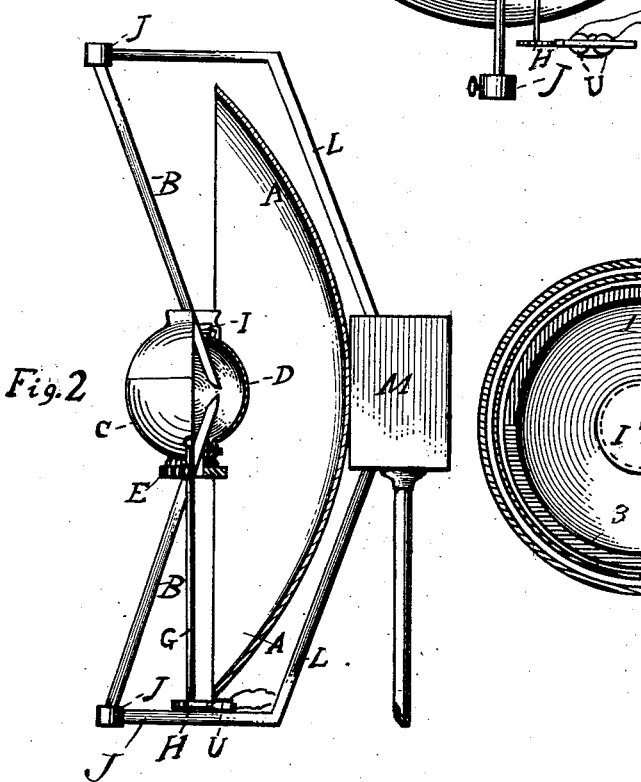
Figure 3:
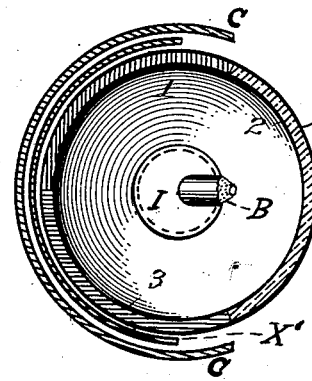

In the said drawings,—Figure 1 is a front elevation of my improved projecting device, with the shield and color globe partially broken away to show the interior arrangement. Fig. 2 is a partial side elevation and partial vertical section thereof. Fig. 3 is a horizontal section, taken in a plane between the carbons of the arc light. Fig. 4 is a front view of a projector in which the reflector is slotted to receive the carbon holders. Fig. 5 is a vertical section of the construction shown in Fig. 4, showing in addition thereto a supplemental mirror or reflecting surface. Fig. 6 is an enlarged view of the color globe and screen, partially broken away to show the interior arrangement. Fig. 7 is a diagrammatic view illustrating a convenient mode of rotating the color globe. Fig. 8 illustrates diagrammatically the projecting device comprising an undulating body forming separated lenses through which the light passes directly to the object or surface to be illuminated. Figs. 9 and 10 are, a fragmentary view and a sectional view, respectively, of a form of reflector or mirror for breaking up the reflected light and blending the colors. Figs. 11 and 12 are similar views of a modified form of reflector. Fig. 13 is a diagrammatic view of a stage arrangement, showing a series of lamps arranged about the stage and connected with a device for synchronously operating the color globes of all the lamps.

In carrying my invention into effect I may employ either a reflected or direct light. I have herein shown my improved projector in connection with an electric arc light, though any light of the required intensity may be used.

As shown in the drawing, A designates a reflector which may be made of any shape to suit the use and application to which it may be put.

B B designates the lamp carbons which are carried on the forward ends of the horizontal arms J of holders L, and said holders are connected with a feeding mechanism, indicated diagrammatically at M. Such feeding mechanism may be either automatically or manually operable. The reflector is shown as attached centrally to the box containing the feeding mechanism.

D designates a transparent, rotative color globe which incloses the adjacent or active ends of the carbons B. Said globe is made of a plurality of parts of different colors, the several parts being shown as divided in lines which are in vertical planes passed through the axis of rotation of the globe. The globe is shown as made of three parts, 1, 2 and 3, (Fig. 3), each including, as herein shown, one-third of the globe. The different parts of the globe are made of different colors, as for instance, the part 1 may be red, the part 2 blue, and the part 3 white. Fig. 6 illustrates more clearly the construction of the multicolored globe which incloses active ends of the carbons B. The carbons enter the globe at an angle to the axis of rotation thereof, meeting near the rear side of the globe. In this manner, more of the crater light is directed to the reflector or mirror A than if the carbons approached each other in alinement. The said carbons pass through bushings I and O seated in upper and lower openings of the globe. The bushings are stationary and close joints are formed between the same, and the carbons and between the outer surfaces of the bushings and the openings in which they are contained. The openings in the upper and lower ends of the globe are surrounded by rims $d$ $d^1$. The upper bushing I fits within the upper rim. The lower bushing O is contained within a central opening in a gear E which extends upwardly into the lower rim $d^1$ of the bushing, said gear E being attached to the globe in any suitable manner for the purpose of rotating the globe. The bushings I and O furnish stationary supports for the carbons and also prevent free access of air to the globe and prevent rapid combustion of the carbons.

As shown in the principal figures of the drawing, the light of the lamp is transmitted to the object or scene to be illuminated through the medium of the reflector A. The part of the globe on the side remote from the reflector is covered by a partispherical-shaped screen C, the relative position of which to the globe is more clearly shown in Fig. 3. This screen is provided at its upper and lower margins with rims $c$ $c^1$ which conform generally to the shape of the rims $d$ $d^1$ of the globe, and the lower rim $c^1$ rests upon the upper face of the gear E (Fig. 6). Said screen is attached to the reflector A by means of radial horizontal arms K K, (Figs. 1 and 4) and is made of two horizontally separable parts to permit convenient insertion of the color globe.

The globe is rotated by means of a rotative shaft G which has bearing at its upper end in the screen and is provided with a pinion F which meshes with the gear wheel E. Said shaft G is provided at its lower end with a ratchet wheel H having ratchet teeth R and through the medium of which the parts are rotated. Such rotation, as before stated, may be manually effected, or may be placed under automatic control. As herein shown, such rotation is effected by an electrical apparatus governed by a metronome Q, the vibratory member T of which closes a normally open circuit by contact of said part T with a spring contact S. Said circuit embraces, in addition to a battery $S^1$, two magnets U U.

V designates an armature which is attracted to the magnets when the latter are energized. Said armature is attached to a pivoted lever W which is provided with a pawl X that engages the ratchet teeth R of the wheel H. The armature and the arm are normally held away from the magnets U by a spring Y against a stop $Y^1$ and the pawl X is held spring-pressed against the ratchet teeth R by means of a spring $w$. When the magnets are energized the armature and lever are drawn toward the magnets, thereby effecting, through the medium of the pawl X, one step of the rotation of the wheel H and shaft G, and, by reason of the gearing described, rotating the multicolored globe one step. The proportion of the pinion F and gear E is such that a one step movement of the pinion produces but a slight rotary movement of the globe, so that the latter rotates but slowly as compared to the movement of the vibratory part of the metronome.

In some instances, a dimmer $X^1$ (Fig. 3) is located between the color globe and the screen, said dimmer acting to gradually cut off the light from the reflector as it is turned from the position shown in said Fig. 3 toward the screen in either direction. Any suitable means may be provided for rotating the dimmer and such rotation may be effected by hand or in synchronism with rotation of the globe.

In Figs. 4 and 5 I have shown the reflector A as provided, in line with the carbon holders, with slots $a$ to receive the holder arms J as the same are moved toward each other in feeding the carbons. This construction makes it unnecessary to use such long carbons, as in the construction previously described. In such previously described construction the inward movement of the carbons is limited by the contact of the holder arms J with the margins of the reflector so that there is a length of carbon which cannot be practically used.

In Fig. 5 I have shown the mirror or reflector A provided with a supplemental mirror or reflector surface P located centrally of the reflector A and in rear of the globe D and screen C. The purpose of said supplemental reflecting surface is to reflect the light directed rearwardly from the globe, and which would otherwise be obscured by the globe and its screen, in such manner that it is thrown upon the illuminated scene. This supplemental surface P is so shaped as to reflect the light which strikes it from the globe to the outer parts of the mirror or reflector whence it is reflected to the illuminated scene or object. This arrangement enables me to use a somewhat smaller reflector A while projecting practically the same volume of light.

The reflecting surface of the reflector or mirror A is preferably broken up in such manner that the color rays reflected therefrom when two or more colors are reflected will be broken up and instead of striking the illuminated scene or object as they are thrown upon the screen, the colors of the rays are broken up or blended so that the color produced is resultant of the two or more colors projected from the lamp. I have shown in Figs. 9 to 12, inclusive, reflector surfaces for the purpose. In Figs. 9 and 10 the surface of the reflector is shown as provided with a plurality of depressions $a^1$, the curvature of which approximates a parabola, each depression constituting in effect a separate or distinct reflector or mirror covering practically all the scene to be illuminated. In the construction shown in Figs. 11 and 12 the surface is broken up by a plurality of concentric grooves $a^2$. The same general effect may be produced by frosting the mirrors instead of indenting the surface as shown. I may also employ, instead of a mirror, the direct rays of the lamp, in which event, in order to blend two or more colors projected through the globe, the color rays are passed through a series of connected lenses $A^1$ as shown in Fig. 8. Said lenses are so arranged as to perfectly diffuse and blend the multicolored light rays. Further the rays may be projected by a reflector located inside the globe behind the light and throwing the rays directly upon the scene through the color globe.

In Fig. 13 I have shown diagrammatically means for connecting a series of lamps with a single metronome or other suitable central station operating device whereby all of the color globes and dimmers or either of a number of lamps may be operated in synchronism and thereby project the light upon a scene from a number of lamps located in different parts of the stage. In said figure, the globe D is shown separated from the lamp, instead of inclosing the same, in order to more clearly indicate the electrical connections with the severed globe. All of the actuating magnets U of the several devices are connected in a circuit which is closed by a single metronome Q or other circuit closing device. In operating a series of lamps and projectors in this manner all of the globes may be set to produce the same illuminating effect with respect to color as the others, or a varying color effect may be produced by adjusting the globes before starting the same to show several different colors. Other devices than electrical devices may be employed for operating a series of lamps in the manner stated.

The operation of the projector constructed as described is generally as follows, reference being had, first, to the reflecting or mirror type of the device. It will be noted by reference to Fig. 3 of the drawing that when one of the color sections, 1, 2 or 3, of the globe is turned directly toward the reflector A, the section 2, as herein shown, the screen C is so related thereto and is of such length that all the light which strikes said reflector A passes through the section of the globe 2 turned directly toward the reflector. Under these circumstances, therefore, all the light directed upon the illuminated scene or object is of a single color. Upon turning the globe in either direction the light from the next adjacent section, and of a different color, falls upon the reflector and is reflected upon the illuminated scene. If a true parabolic curve be used and with a smooth reflecting surface the result of casting two colors upon the reflector would be that two colors would be cast upon the illuminated scene with a reasonably sharp line of demarcation between them. By breaking up the reflecting surface, however, as shown in Figs. 9 to 12, inclusive, or otherwise, the colors falling upon the screen are so blended as to produce, instead of the original or primary colors, a resultant color which at any given time depends upon the proportions of the primary colors reflected upon the scene. As said globe is gradually turned through a single rotation the resultant light from the multi-colored sections of the globe produces a gradually changing effect upon the illuminated scene the specific effect or color of which will depend upon the colors employed and their proportions in the blending or diffusion thereof. For instance, by the proper arrangement of the colors on the globe sections the light of the illuminated scene may be changed from a bright light, as a daylight scene or a bright moonlight scene, to a twilight scene, or a night scene or vice versa; and the effects are such that desired and sought for effects in stage lighting for extravaganza productions may be varied almost infinitely.

The device as herein shown and as heretofore described is particularly adapted to produce what is known as glow-light and this light may be of a permanent color for a given scene or may be gradually changed from the initial color to another given color. For different uses, therefore, globes having various colors are employed. While I have shown a device for automatically operating the globe to revolve it, yet, in many instances, the changes in the color of the light to be thrown upon an illuminated scene will necessarily be made by hand manipulation of the device.

The operation of the device shown in Fig.

8 is in all substantial respects the same as that just described the only difference being that the light passes directly to the scene being illuminated instead of being reflected thereupon and the lens of the series acts to break up or diffuse the color-rays so as to produce the desired resultant colors.

When it is desired to dim the illuminated scene, the dimmer X¹ is rotated so as to exclude a portion of the light from the screen or from the lenses, as the case may be, thereby lessening the intensity of the volume of light thrown upon the scene. It is to be understood that the dimmer does not have the effect of entirely excluding the light from any part of the scene, inasmuch as the arrangement of the reflector, or the lenses, as the case may be, is such that the light from all parts of the reflector is diffused over the entire scene, so that when a portion of the light is cut off by the dimmer it only results in dimming the general effect and not excluding light entirely from a part of the scene.

In all of the constructions described it will be noted that the arc is entirely inclosed within the globe so that there is no danger of surrounding objects, such as draperies, becoming ignited by contact with the flame of the arc nor is there any possibility of sparks passing from the arc to exterior objects. The device is therefore fireproof.

It is obvious that a partial globe, or one that does not extend entirely around the lamp, if made of different colored sections, will produce the same effect when interposed between the lamp and a reflector or a series of lenses, with the exception that the effect produced thereby will be interrupted by the interruption of the globe. The continuous globe is preferred inasmuch as its movement may be continuous and a gradually unbroken light effect produced.

Claims.

1. In a device for the purpose described, the combination of a light projecting device, a screen arranged in front of said light projecting device, a source of light arranged between said screen and projecting device, and a spherically formed color medium extending about the source of light and interposed between the said source of light and projecting device and adjustable about the said source of light.

2. In a device for the purpose described, the combination of a light projecting device, a screen arranged in front of said light projecting device, a lamp interposed between said screen and projecting device and a rotative globe inclosing said lamp.

3. In a device for the purpose described, the combination of a light projecting device having a concave, roughened surface, a screen opposed to said surface, a source of light interposed between said screen and surface, and a multicolor medium interposed between said source of light and surface.

4. The combination with a lamp, of a reflector in rear thereof, having a broken or roughened reflecting surface, a rotative multicolored globe interposed between the lamp and reflector, and a screen inclosing the lamp on the side thereof remote from the reflector.

5. The combination with a lamp, of a reflector in rear thereof, having a broken or roughened reflecting surface, a rotative, multicolored globe interposed between the lamp and reflector, a screen inclosing the lamp on the side thereof remote from the reflector and a movable dimmer interposed between said screen and globe.

6. The combination with the carbons of an electric arc lamp, of a rotative, transparent globe inclosing the meeting ends of the carbons, stationary bushings provided with openings through which the carbons pass and themselves located in openings in said globe, said globe being made of sections of different colors, and a projecting device for throwing the light passed through said color globe upon a desired scene or object, said projecting device being constructed to blend said color rays.

7. The combination with the carbons of an electric arc lamp, of a rotative globe inclosing the meeting ends of said carbons and composed of a plurality of sections of different colors, a reflector in rear of the globe constructed to break up and blend the color rays and a screen located in front of the globe.

8. The combination with the carbons of an electric arc lamp, of a rotative globe inclosing the meeting ends of said carbons and composed of a plurality of sections of different colors, a reflector in rear of the globe and constructed to break up and diffuse the color rays, a screen in front of the globe, and a dimmer interposed between said screen and globe and adapted to be moved about the globe.

9. The combination with the carbons of an electric arc lamp, of a globe surrounding the meeting ends of said carbons and composed of a plurality of sections of different colors, said carbons being directed obliquely toward the rear side of said globe, a reflector in rear of said globe, and a screen on the side of the carbons remote from the reflector, said reflector being constructed to blend the color rays from said globe.

10. The combination with the carbons of an electric arc lamp, of a rotative globe inclosing the meeting ends of said carbons and composed of a plurality of sections of different colors, a reflector in the rear of the globe and a screen located in the front of the globe.

11. The combination with the carbons of an electric arc lamp, of a rotating globe inclosing the meeting ends of said carbons and composed of a plurality of sections of different colors, a reflector in the rear of the globe, a screen in front of the globe, and a dimmer interposed between said screen and globe and adapted to be moved about the globe.

12. The combination with the carbons of an electric arc lamp, a globe surrounding the meeting ends of said carbons and composed of a plurality of sections of different colors, said carbons being directed obliquely toward the rear side of said globe, a reflector in the rear of said globe, and a screen on the side of the carbons remote from the reflector.

CARL R. FORSTER.

Witnesses:
    F. A. HOPKINS,
    M. B. ALLSTADT.